(No Model.) 2 Sheets—Sheet 1.

B. N. BOTTS.
ELECTRIC ANNUNCIATOR.

No. 379,758. Patented Mar. 20, 1888.

Witnesses,
Geo. H. Strong.

Inventor,
B. N. Botts.
By Dewey & Co.
Att'ys (No Model.) 2 Sheets—Sheet 2.

B. N. BOTTS.
ELECTRIC ANNUNCIATOR.

No. 379,758. Patented Mar. 20, 1888.

Witnesses,
Geo. H. Strong
J. H. Krouse

Inventor
B. N. Botts.
By Dewey & Co.
Atty

UNITED STATES PATENT OFFICE.

BARNET N. BOTTS, OF PASO ROBLES, CALIFORNIA.

ELECTRIC ANNUNCIATOR.

SPECIFICATION forming part of Letters Patent No. 379,758, dated March 20, 1888.

Application filed October 1, 1887. Serial No. 251,253. (No model.)

*To all whom it may concern:*

Be it known that I, BARNET N. BOTTS, of Paso Robles, San Luis Obispo county, State of California, have invented an Improvement in Electric Annunciators; and I hereby declare the following to be a full, clear, and exact description of the same.

My invention relates to the class of electric annunciators; and my invention consists in the constructions and combinations of devices which I shall hereinafter fully describe and claim.

Figure 2:
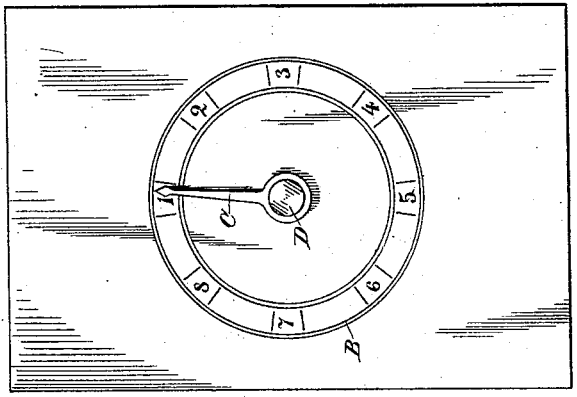
Figure 1:
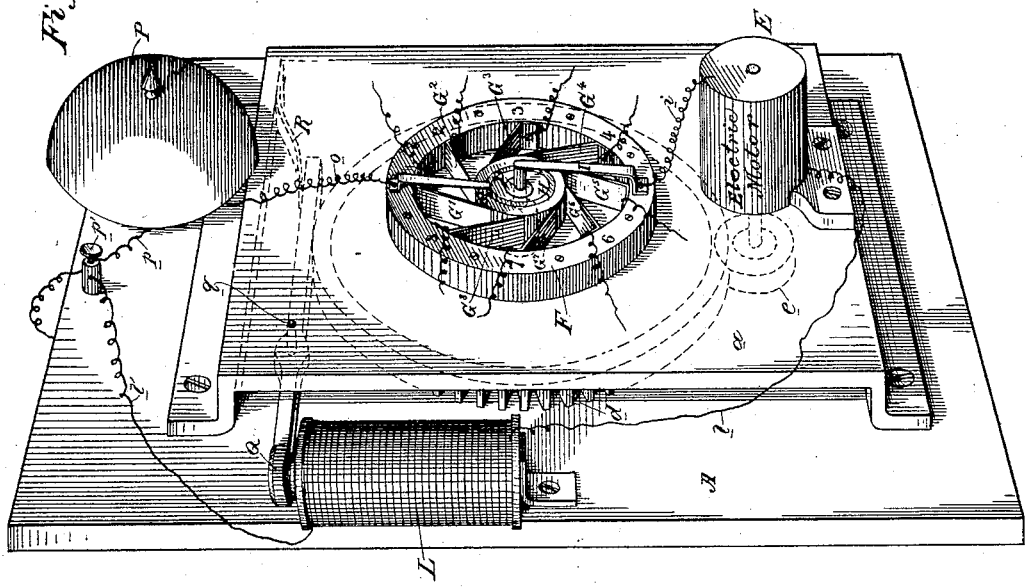
Figure 3:
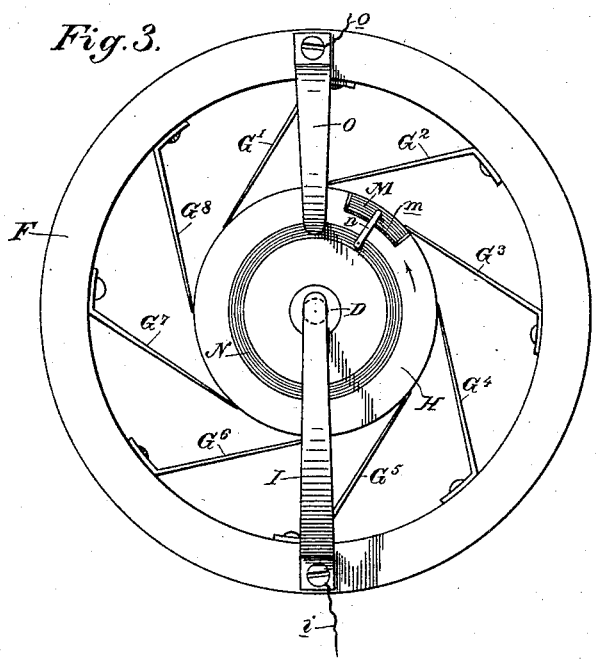
Figure 4:
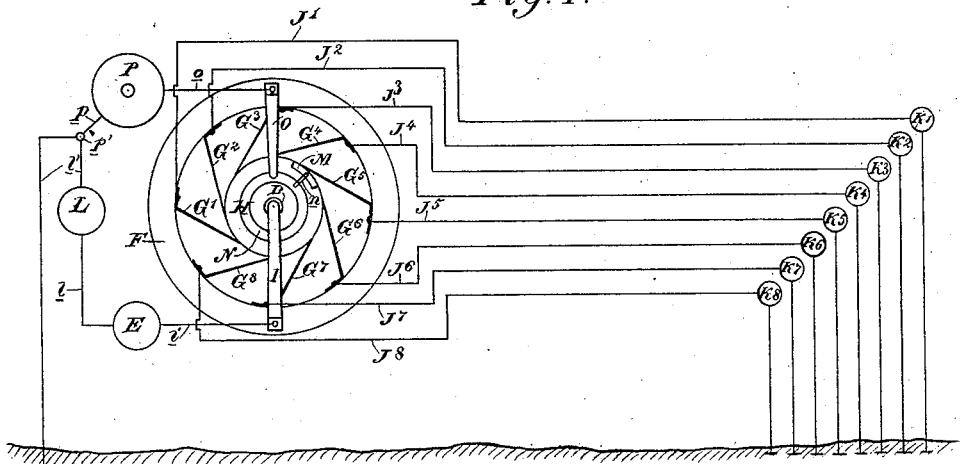

Referring to the accompanying drawings for a more complete explanation of my invention, Figure 1 is a perspective view from the back of the annunciator. Fig. 2 is a front elevation. Fig. 3 is an enlarged detail elevation of the switch. Fig. 4 is a diagram showing the circuits.

The casing of the annunciator consists of a front portion, A, and a back portion, $a$. On the front of the annunciator is formed or fixed an indicator or dial, B, having, as shown in Fig. 2, numbers arranged from 1 to 8, each number representing a subscriber or operator of the machine. Over this dial moves a hand, C, which is secured upon a shaft, D, which is mounted in the frame of the annunciator and is provided with a gear-wheel, $d$, with which meshes a pinion, $e$, on the shaft of any well-known form of electric motor, E, which is on the lower portion of the casing.

In the rear of the casing is attached a ring, F, which is concentric with the shaft D, and has secured to its inner periphery a number of independent contact-springs which correspond in position to the numbers on the face of the dial, and which I may call the "G" series, being lettered, respectively, $G'$ $G^2$, and so on up to and through $G^8$. These springs project inwardly and tangentially to the shaft D and have their inner ends bearing upon a disk, H, fast on said shaft D. Upon the outer end of shaft D a contact-spring, I, bears, said spring being connected by a wire, $i$, with the electric motor E. From each of the springs G extends a circuit-wire forming the line-wires of the subscribers, and which, as shown in diagram 4, are lettered, respectively, $J'$, and so on through $J^8$. They connect with stations $K'$ to $K^8$, as shown in diagram. Upon the casing is an electro-magnet, L, which is connected electrically with the motor by a wire, $l$, and with the ground by a wire, $l'$. It will be seen that we now have electrical circuits from the stations of the subscribers, through the wires $J'$, &c., the contact-springs $G'$, &c., the disk H, the shaft D, the contact-spring I, wire $i$, motor E, wire $l$, electro-magnet L, and wire $l'$, to the ground.

If a current is sent from subscribing-station I, or any of the other stations, through the circuit described, the motor will be caused to operate, and through the gearing $e$ $d$ will rotate the shaft D and move the hand over the face of the dial. Now, in order to interrupt said current in such a manner as to arrest the hand at any given point, I have but to deflect the current when the hand has reached that point, thereby cutting out the motor and stopping its movement. To do this I let into the periphery of the disk a segmental contact-piece, M, which is insulated at each end from the disk by an air-space and below by some insulating material, as is designated by $m$. In the face of the disk I let or secure a metal ring, N, which is insulated from the disk itself, and is connected with the segmental piece M by means of a small contact, $n$.

O is a spring having its lower end in contact with the ring N. Its upper end is connected by a wire, $o$, with the call-bell P, from which a wire, $p$, extends to a post, $p'$, where it joins the ground-wire of the motor and electro-magnet circuit.

The operation of this switch is as follows: A current being sent from a subscriber, as before described, causes the rotation of the shaft D, with its disk H, and the movement of the hand C. This movement will continue until the disk has brought its insulated contact-segment M around to a position under that spring of the G series through which the current is passing, whereupon said current is diverted from the main or motor circuit, it now passing from the said spring, through the segment M, contact $n$, ring N on the face of the disk, spring O, wire $o$, call-bell P, giving the alarm, and wires $p$ and $l'$, to the ground. Because of the diversion of this current the motor ceases to operate, and the hand comes to a state of rest. The mechanism is so arranged that this point of rest shall be over the figure or number on the dial which corresponds to the number of the spring of the G series through which the current passes, and to the number of the subscriber operating it. This operation takes place when the current is sent from any subscriber—that is to say, the first effect of the current is to cause the operation of the motor and the movement of the hand, and this movement continues until the current is diverted, by switching it out from the spring, through the segmental contact-piece M, when said piece moves under the spring, into the gong-circuit, whereupon the motor ceases to operate, and the hand comes to a standstill at the number which corresponds to the subscriber who set it in operation. It will thus be seen that the hand will come to a stop at the proper place, and at the same time notice will be given of this fact. Now, in order to arrest the hand instantly to overcome the momentum which it may have from the mechanical connections, I have the following arrangement:

Q is an armature for the electro-magnet L, said armature being pivoted on a pin, $q$, and having its other end passing over the gear $d$ and normally in contact with it, so that it acts as a brake. It is held in this position by a spring, R. Now, when the current is passing through the motor, it also passes through and energizes the electro-magnet L, so that the armature is attracted, and this movement, overcoming the power of the spring R, raises the end of the armature from its normal contact with the gear, so that the parts operate without obstruction; but as soon as the current is diverted, as before described, into the gong-circuit, the magnet, being de-energized, frees its armature, and the spring throws it back to its normal position in contact with the gear, thereby braking it and checking its movement instantly, so that all momentum is overcome.

Having thus described my invention, what I claim as new, and desire to secure by Letters Patent, is—

1. In an electric annunciator, a fixed dial and a hand moving over it, an electric motor, and connections by which it operates the hand, in combination with a rotary disk on the hand-shaft, electrically connected with the motor, independent contact-springs against which the periphery of the disk operates, independent circuit-wires from the subscribing-stations which include the contact-springs and the motor, whereby the hand is arrested, and the means for diverting the current to cut the motor out of the circuit and arrest the hand, consisting of an insulated contact-piece in the periphery of the disk, an insulated ring in the face of the disk electrically connected with the contact-piece, a spring in contact with the ring, and a switch-circuit from said spring, substantially as herein described.

2. In an electric annunciator, a fixed dial and a hand moving over it, an electric motor, and connections by which it operates the hand, in combination with a rotary disk on the hand-shaft, electrically connected with the motor, independent contact-springs against which the periphery of the disk operates, independent circuit-wires from the subscribing-stations including said springs, and the motor whereby the hand is moved over the dial, and the switch for cutting the motor out of the circuit and arresting the hand, consisting of an insulated contact-piece in the periphery of the rotary disk, an insulated ring on the face of the disk and electrically connected with the contact-piece, a spring in contact with the ring and a switch-circuit from the spring, and an alarm apparatus in said circuit, whereby notice is given of the arrest of the hand, substantially as herein described.

3. In an electric annunciator, a fixed dial and a hand moving over it, an electric motor, and connections by which it operates the hand, in combination with a rotary disk on the hand-shaft, electrically connected with the motor, fixed springs against which the periphery of the disk moves, independent circuit-wires from the subscribing-stations to the springs, whereby the motor is operated and the hand moved, a switch for diverting the current from the motor, by which it is cut out of the circuit and the hand arrested, and a means for checking the momentum of the hand when the motor is cut out of the circuit, consisting of an electro-magnet in the motor-circuit and a pivoted armature bearing normally, when unaffected by the magnet, on the driving-connections and braking them, substantially as herein described.

4. In an electric annunciator, a fixed dial and a hand moving over it, an electric motor, and connections by which it operates the hand, in combination with a disk on the hand-shaft, electrically connected with the motor, fixed springs against which the periphery of the disk moves, and circuit-wires from the subscribing stations to said springs, whereby the motor is driven and the hand moved over the dial, the switch by which the current is diverted to cut the motor out of the circuit and arrest the hand, consisting of the insulated contact-piece in the periphery of the disk, the insulated ring electrically connected therewith, and the switch-circuit from the ring, the call-bell in the said circuit for giving notice of the arrest of the hand, and the means for checking the momentum of the hand when the motor is cut out of the circuit, consisting of the electro-magnet in the motor-circuit, the pivoted armature, and the spring causing the armature to normally bear, when unaffected by the magnet, upon the driving-connections, thus braking them, substantially as herein described.

In witness whereof I have hereunto set my hand.

BARNET N. BOTTS.

Witnesses:
DAVID TERRIS,
W. J. SHERMAN.